(12) United States Patent
Ohara

(10) Patent No.: US 8,515,458 B2
(45) Date of Patent: Aug. 20, 2013

(54) WIRELESS TELEPHONE SYSTEM, RELAY DEVICE, AND WIRELESS TELEPHONE DEVICE

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 588 days.

(21) Appl. No.: 12/700,174

(22) Filed: Feb. 4, 2010

(65) Prior Publication Data

US 2010/0197312 A1 Aug. 5, 2010

(30) Foreign Application Priority Data

Feb. 5, 2009 (JP) ................................. 2009-024869

(51) Int. Cl.
*H04W 4/02* (2009.01)

(52) U.S. Cl.
USPC ......... 455/456.3; 455/7; 455/41.1; 455/435.1

(58) Field of Classification Search
USPC ............. 455/415, 414.1, 414.2, 422.1, 435.1, 455/445, 446, 456.1, 456.3, 7, 11.1, 515, 455/517, 417, 13.1, 426.1, 41.1, 41.2
See application file for complete search history.

(56) References Cited

U.S. PATENT DOCUMENTS

| 2005/0002373 | A1* | 1/2005 | Watanabe et al. | 370/346 |
|---|---|---|---|---|
| 2006/0062190 | A1* | 3/2006 | Suga | 370/338 |
| 2007/0140191 | A1 | 6/2007 | Kojima | |
| 2009/0011778 | A1 | 1/2009 | Jung et al. | |

FOREIGN PATENT DOCUMENTS

| CN | 101034931 | 9/2007 |
|---|---|---|
| CN | 101102310 | 1/2008 |
| CN | 101340726 | 1/2009 |
| EP | 2012480 A1 | 1/2009 |
| JP | 09247745 A | 9/1997 |
| JP | 2002152109 A | 5/2002 |
| JP | 2005-229591 | 8/2005 |
| JP | 2006086936 A | 3/2006 |
| JP | 2007166464 A | 6/2007 |
| JP | 2008-219733 | 9/2008 |

OTHER PUBLICATIONS

European office action for application No. 10250194.7 mailed Nov. 8, 2011.
Notification of Reasons for Rejection for Japanese Patent Application No. 2009-024869 mailed Nov. 16, 2010.
Extended European Search Report for Application No. 10250194.7 mailed Feb. 9, 2011.
Office Action received in corresponding Chinese Application No. 201010113681.4 mailed Jul. 4, 2012.
Chinese Office Action received in corresponding Chinese Patent Application No. 201010113681.4, dated Jan. 21, 2013.

\* cited by examiner

*Primary Examiner* — John J Lee
(74) *Attorney, Agent, or Firm* — Banner & Witcoff, Ltd.

(57) ABSTRACT

A wireless telephone system may be provided with a relay device, first and second wireless telephone devices. The relay device may receive a call request from the first wireless telephone device, determine whether the second wireless telephone device is being located within a wireless communication area of the relay device, and send connection information of the second wireless telephone device to the first wireless telephone device on a condition that it is determined that the second wireless telephone device is being located within the wireless communication area of the relay device. The first wireless telephone device may send a connection request for a direct communication with the second wireless telephone device with the connection information of the second wireless telephone device as a destination thereof. The second wireless telephone device may receive the connection request.

10 Claims, 11 Drawing Sheets

FIG. 3

| SIP URI | IP Address | Registration Time | |
|---|---|---|---|
| sip:aaa@sip20.com | 10.138.X.X | 10:00:00 | —77 |
| sip:bbb@sip20.com | 10.138.XX.X | 10:11:11 | —78 |
| | | | |

| Connection ID | Usage Channel | Authentication · Encryption Information | SSID | Sending Time |
|---|---|---|---|---|
| 786524783 | 1 | WEP<br>WEPKEY:<br>A3BCC1JP5OOJD | CCSSID1 | |
| 76546762017 | 4 | WEP<br>WEPKEY:<br>AA9BC33JPPO3J | CCSSID2 | |
| 6748273320 | 7 | WEP<br>WEPKEY:<br>F8ABCCJ77POOJ | CCSSID3 | |

80, 82, 84, 86, 88, 89

90

| First IP | First SIP URI | Second IP | Second SIP URI | Occurrence Time |
|---|---|---|---|---|
| 10.138.XX.X | sip:bbb@sip20.com | 10.138.X.X | sip:aaa@sip20.com | 10:05:00 |
| | | | | |
| | | | | |

| Command | Connection ID | Channel | Authentication·Encryption Information | SSID | Destination IP |
|---|---|---|---|---|---|
| Redirection Request | 98437652 | 7 | WEP WEPKEY: F8ABCCJ77 POOJ | CCSSID3 | 10.138.X.X |

FIG. 9

| Command | Connection ID | Channel | Authentication·Encryption Information | SSID |
|---|---|---|---|---|
| Ad-hoc Shifting Request | 98437652 | 7 | WEP WEPKEY: F8ABCCJ77 POOJ | CCSSID3 |

FIG. 10

| Command | Connection ID | Ad-hoc Communication Result | First IP | First SIP URI | Second IP | Second SIP URI |
|---|---|---|---|---|---|---|
| Channel Release Notice | 9438257 | KEEP ALIVE Error | 10.138.XX.X | sip:bbb@sip20.com | 10.138.X.X | sip:aaa@sip20.com |

WIRELESS TELEPHONE SYSTEM, RELAY DEVICE, AND WIRELESS TELEPHONE DEVICE

CROSS-REFERENCE TO RELATED APPLICATIONS

This application claims priority to Japanese Patent Application No. 2009-024869, filed on Feb. 5, 2009, the contents of which are hereby incorporated by reference into the present application.

TECHNICAL FIELD

The present specification discloses a technology for a wireless telephone device communicating another wireless telephone device.

DESCRIPTION OF RELATED ART

A technique exists that a wireless telephone device communicates with another wireless telephone device via a relay device.

SUMMARY

A relay device sends audio data sent from the one wireless telephone device to the other wireless telephone device. When a large number of telephone communications are made via the relay device, the communication load imposed on the relay device increases. As a result of this, stable telephone communication becomes very difficult. This specification provides a technology that enables to lessen the communication load of the relay device.

This specification discloses the following wireless telephone system. The wireless telephone system may comprise a relay device, a first wireless telephone device configured to communicate with another device in a wireless communication area of the relay device, and a second wireless telephone device configured to communicate with another device in the wireless communication area of the relay device. The relay device may comprise a call request receiving unit configured to receive a call request from the first wireless telephone device, the call request including telephone identification information of the second wireless telephone device, a determining unit configured to determine whether the second wireless telephone device is being located within the wireless communication area of the relay device on a condition that the call request is received, and a connection information sending unit configured to send connection information of the second wireless telephone device to the first wireless telephone device on a condition that it is determined that the second wireless telephone device is being located within the wireless communication area of the relay device. The first wireless telephone device may comprise a call request sending unit configured to send the call request to the relay device, and a connection request sending unit configured to send a connection request for a direct communication with the second wireless telephone device, with the connection information of the second wireless telephone device as a destination. The second wireless telephone device may comprise a connection request receiving unit configured to receive the connection request. Furthermore, the above-mentioned terminology "on a/the condition" may comprise another condition (an AND condition and/or an OR condition). That is, for example, a description such as "execute N on a condition of M" may signify that N will be executed in a case where at least M has been realized. The same will hold true hereinbelow in a case where the term "on a/the condition" is used.

A relay device is also novel and useful. The relay device may comprise a call request receiving unit configured to receive a call request from a first wireless telephone device, the call request including telephone identification information of a second wireless telephone device, a determining unit configured to determine whether the second wireless telephone device is being located within a wireless communication area of the relay device on a condition that the call request is received, and a connection information sending unit configured to send connection information of the second wireless telephone device to the first wireless telephone device on a condition that it is determined that the second wireless telephone device is being located within the wireless communication area of the relay device.

A wireless telephone device is also novel and useful. The wireless telephone device is configured to communicate with another device in a wireless communication area of a relay device. The wireless telephone device may comprise a call request sending unit configured to send a call request to the relay device, the call request including telephone identification information of an other wireless telephone device, and a connection request sending unit configured to send, in a case where connection information of the other wireless telephone device is received from the relay device after sending the call request, a connection request for a direct communication with the connection information of the other wireless telephone device as a destination.

BRIEF DESCRIPTION OF DRAWINGS

FIG. 3 shows an example of a telephone information table.
FIG. 4 shows an example of a usage channel table.
FIG. 8 shows an example of a redirection request.
FIG. 9 shows an example of a shift to ad-hoc request.
FIG. 10 shows an example of a channel release notice.

DETAILED DESCRIPTION OF THE PREFERRED EMBODIMENT

System Configuration

Figure 1:
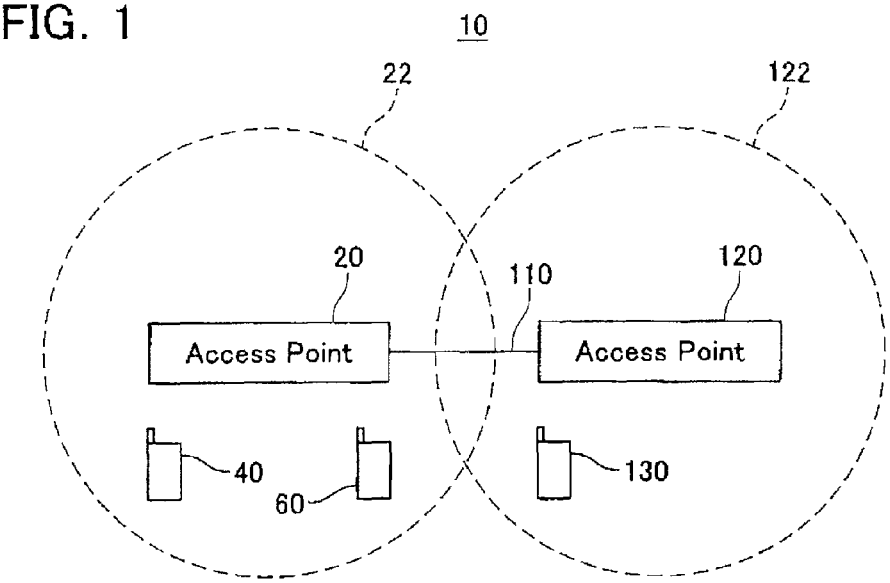
FIG. 1 shows an example of the configuration of a wireless telephone system.

An embodiment will be explained by referring to the drawings. The wireless telephone system 10 comprises a plurality of access points 20, 120 and telephone devices 40, 60, 130. In FIG. 1, only three telephone devices 40, 60, 130 are shown, however, the wireless telephone system 10 may comprise a larger number of telephone devices. Furthermore, the telephone devices 40, 60, 130 are portable telephone devices (for example, a mobile (cell phone), PDA, or the like). The respective telephone devices 40, 60, 130 are able to perform wireless telephone communications using SIP. A SIP server is needed to perform a wireless telephone communication using the SIP. When a telephone device is registered in the SIP server, a SIP URI corresponding to the SIP server is assigned to this telephone device. In this embodiment, the respective access points 20, 120 function as SIP servers. The telephone devices 40 and 60 are registered in the access point 20. Further, the telephone device 130 is registered in the access point 120. A unique SIP URI (SIP Uniform Resource Identifier) is assigned to each of the telephone devices 40, 60, 130. Furthermore, the SIP URI of each telephone device 40, 60, 130 comprises the URI of the access point 20, 120 in which this telephone device is registered. For example, the SIP URI (for example, sip:aaa@sip20.com) of the telephone device 40, which is registered in the access point 20, comprises the "sip20.com" URI of the access point 20. Similarly, the SIP URI (for example, sip:ccc@sip120.com) of the telephone device 130, which is registered in the access point 120, comprises the "sip120.com" URI of the access point 120.

(Access Point Configuration)

Figure 2:
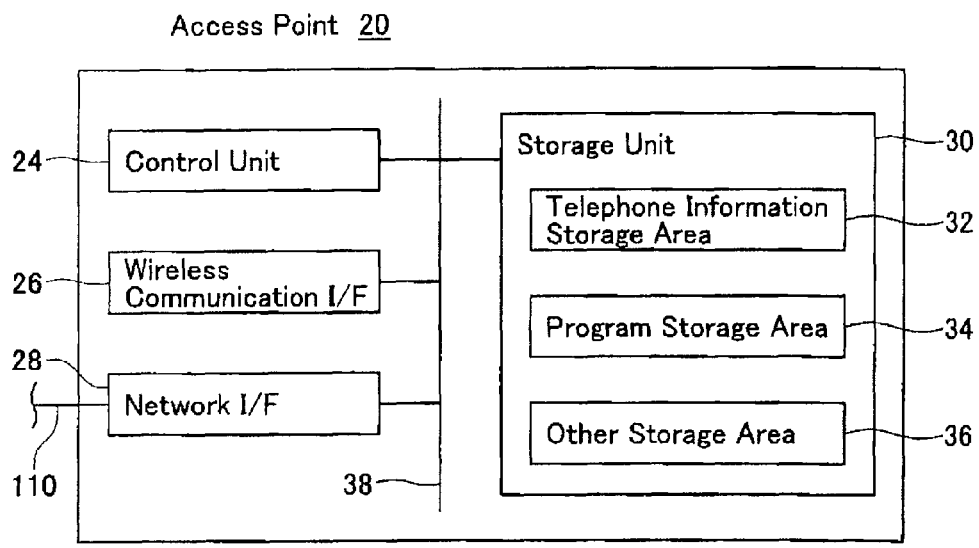
FIG. 2 shows an example of the configuration of an access point.

The access point 20 comprises a control unit 24, a wireless communication interface 26 (referred to as the wireless communication I/F 26 in FIG. 2 and below), a network interface 28 (referred to as the network I/F 28 in FIG. 2 and below), and a storage unit 30. The respective units of the access point 20 are connected by a bus 38. The control unit 24 executes various processes in accordance with a program stored in the storage unit 30. The contents of the processes executed by the control unit 24 will be explained in detail further below. The wireless communication I/F 26 comprises the wireless communication area 22 in which wireless communication can be made as shown in FIG. 1. The wireless communication I/F 26 is an interface for performing a wireless communication between the telephone devices 40, 60 located in the wireless communication area 22. The wireless communication I/F 26 makes it possible to receive telephone information comprising the SIP URI of the telephone devices 40, 60 from the telephone devices 40, 60 located in the wireless communication area 22. A LAN line 110 is connected to the network I/F 28. The LAN line 110 is connected to the access point 120. The access point 20 is able to communicate with the access point 120 via the network I/F 28 and the LAN line 110.

The storage unit 30 is configured from a ROM, an EEPROM, and a RAM. The storage unit 30 comprises a telephone information storage area 32, a program storage area 34, and an other storage area 36. The telephone information storage area 32 stores a registration information table (omitted from the drawing), a telephone information table 70, a usage channel table 80, and a poor connection table 90. The contents of each table will be orderly explained.

First, the registration information table will be explained. The designer, user and so forth is able to register a telephone device SIP URI in the registration information table. The registration information table is able to store a telephone device IP address associated with the SIP URI of this telephone device. In this embodiment, the telephone devices 40, 60 are registered in the access point 20. Therefore, the SIP URI and IP address of the telephone device 40 are correspondingly stored in association in the registration information table of the access point 20, and, in addition, the SIP URI and IP address of the telephone device 60 are stored in association in the registration information table of the access point 20. Furthermore, the location information of each of the telephone devices 40, 60 is also stored in the registration information table. The location information is identification information of the access point through which the respective telephone device 40, 60 is able to perform a wireless communication. The control unit 24 is able to update the IP address and the location information. For example, in a case where the telephone device 40 is located within the wireless communication area 122 of the access point 120, the control unit 24 receives from the access point 120 the IP address and information indicating that the telephone device 40 is located within the wireless communication area 122. The control unit 24 records the access point 120 identification information (e.g., the URI of the access point 120 (e.g., sip120.com)) as the location information of the telephone device 40, and records the received IP address as the telephone device 40.

Next, the telephone information table 70 will be explained with reference to FIG. 3. The SIP URI 72, IP address 74 and registration time 76 of the telephone devices 40, 60 located within the wireless communication area 22 are recorded in association in the telephone information table 70. The control unit 24 is able to record information in the telephone information table 70. The respective information of the telephone device 40 is recorded in row 77. The respective information of the telephone device 60 is recorded in row 78.

Next, the usage channel table 80 will be explained with reference to FIG. 4. A connection ID 82, a usage channel 84, authentication/encryption information 86, SSID (Service Set Identifier) 88, and a sending time 89 are recorded in association in the usage channel table 80. In a case where a pair of telephone devices performs an ad-hoc communication, this pair of telephone devices must use a common channel, authentication/encryption information and SSID. The access point 20 sends to each telephone device of the pair the above-mentioned respective information that is required for performing the ad-hoc communication. The respective information that the access point 20 sends to the pair of telephone devices will be explained in detail below. The control unit 24 records the respective information sent to the pair of telephone devices in the usage channel table 80.

Next, the poor connection table 90 will be explained with reference to FIG. 5. The control unit 24 is able to record in the poor connection table 90 a combination of two telephone devices that are not able to perform the ad-hoc communication. The IP address (a first IP 92) and the SIP URI (a first SIP URI 94) of one of the telephone devices, the IP address (a second IP 96) and the SIP URI (a second SIP URI 96) of another of the telephone devices, and an occurrence time 99 are recorded in association in the poor connection table 90. The way the control unit 24 respectively records information in the telephone information table 70, the usage channel table 80 and the poor connection table 90 will be explained in detail below. Further, the access point 120 comprises the same configuration as the access point 20 except that the telephone device 130 is registered therein.

(Telephone Device Configuration)

Figures 5, 6:
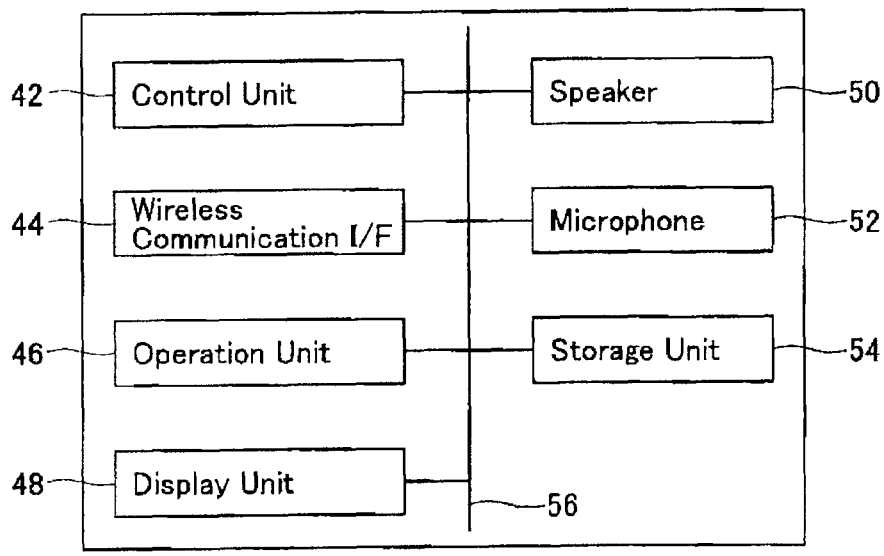
FIG. 5 shows an example of a poor connection table.
FIG. 6 shows an example of the configuration of a telephone device.

As shown in FIG. 6, the telephone device 40 comprises a control unit 42, a wireless communication interface 44 (referred to as the wireless communication I/F 44 in FIG. 6 and below), an operation unit 46, a display unit 48, a speaker 50, a microphone 52, and a storage unit 54. The control unit 42 executes various processes in accordance with a program stored in the storage unit 54. The contents of the processes executed by the control unit 42 will be explained in detail below. The wireless communication I/F 44 is an interface for performing wireless communications with the access points 20, 120 and other wireless telephones. A state in which the telephone device 40 is able to perform the wireless communication with the access points 20, 120 via the wireless communication I/F 44 is called an "infrastructure mode". Alternatively, a state in which the telephone device 40 is able to perform the wireless communication directly with another telephone device via the wireless communication I/F 44 is called an "ad-hoc mode". The control unit 42 is configured able to switch the mode between the infrastructure mode and the ad-hoc mode.

The operation unit 46 comprises a plurality of keys. For example, the operation unit 46 comprises a starting key and numerical keys. The starting key may be referred to hereinbelow as a CALL/TALK key, or an END key. The display unit 48 is able to display a variety of information. The user is able to make a call by using the speaker 50 and the microphone 52. The storage unit 54 stores a program to be executed by the control unit 42. The storage unit 54 is able to store data that is created in accordance with the steps by which the control unit 42 executes a process. Further, the telephone devices 60 and 130 comprise the same configuration as the telephone device 40.

(Access Point Main Process)

Figure 7:
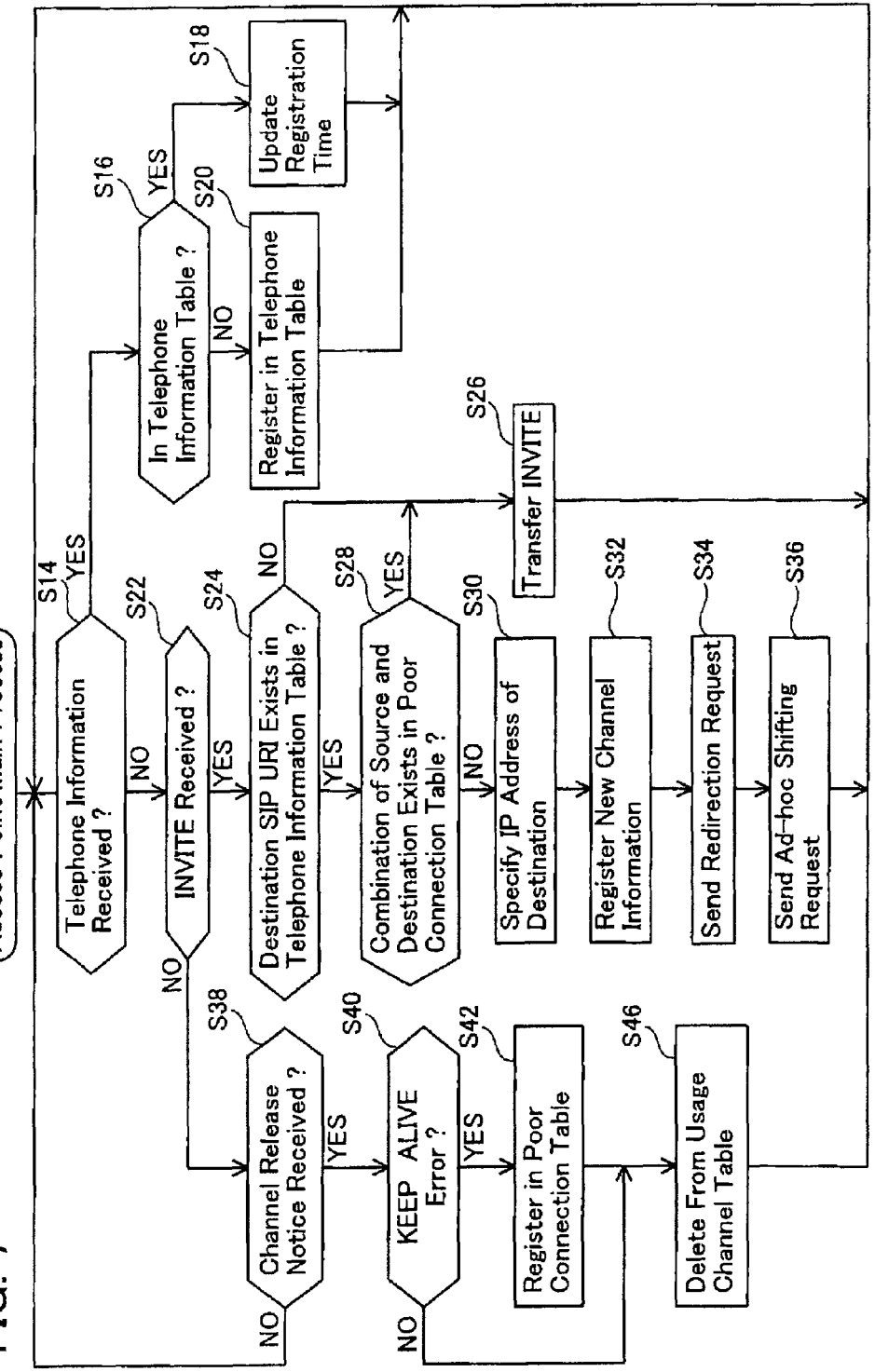
FIG. 7 shows a flowchart of an access point main process.

Next, the contents of the processes executed by the control unit 24 of the access point 20 will be explained. First, the content of the main process of the access point 20 will be explained with reference to FIG. 7. The respective telephone devices 40, 60, 130 regularly send telephone information including their own SIP URI and IP address. The access point 20 is able to receive the telephone information that is sent from the telephone devices 40, 60 located within the wireless communication area 22. The control unit 24 monitors for the reception of the telephone information by the wireless communication I/F 26 (S14). In a case of YES in S14, the control unit 24 checks whether or not the received telephone information is recorded in the telephone information table 70 (S16). In a case of YES in S16, the control unit 24 updates the registration time 76 associated to the received telephone information to a time at which the aforesaid telephone information was received (S18), and proceeds to S14. On the other hand, in a case of NO in S16, the control unit 24 registers the SIP URI 72, the IP address 74 and the registration time 76 of the telephone information table 70 based on the received telephone information (S20) and proceeds to S14. In this embodiment, it is supposed that the telephone devices 40, 60 are registered in the telephone information table 70.

The control unit 24 monitors for a reception of INVITE that has been sent from the telephone device (S22). If YES in S22, the control unit 24 checks whether or not the destination SIP URI included in the INVITE is recorded in the telephone information table 70 (S24). If NO in S24, the control unit 24 transfers the INVITE to the access point in which the destination telephone device is registered based on the destination SIP URI (S26). For example, in a case where the telephone device 40 sends INVITE with the telephone device 130 as the destination, the telephone device 40 sends the INVITE to the access point 20 in which the telephone device 40 is registered. The telephone device 130 is not located in the wireless communication area 22 of the access point 20. Therefore, the control unit 24 transfers the INVITE to the access point 120 that is identified based on the SIP URI of the destination telephone device 130. The access point 120, upon receiving the INVITE, checks the registration information table for the location information that is recorded therein in association to the SIP URI of the destination telephone device 130. The access point 120 transfers the INVITE to the access point in which the location information is registered. In this embodiment, since the telephone device 130 is located in the wireless communication area 122, the access point 120 transfers the INVITE to the telephone device 130. When a call between the telephone device 40 and the telephone device 130 is connected, the access point 20 and the access point 120 relay the telephone communication, that is, the audio data communication that is performed between the telephone device 40 and the telephone device 130.

In a case of YES in S24, the control unit 24 checks whether or not a combination of the source telephone device SIP URI and the destination telephone device SIP URI is recorded in the poor connection table 90 (S28). For example, in a case where the telephone device 40 sends INVITE specifying the telephone device 60 as the destination, the control unit 24 checks whether or not the combination of the telephone device 40 SIP URI and the telephone device 60 SIP URI, which is included in the received INVITE, is recorded in the poor connection table 90. In a case of YES in S28, the control unit 24 proceeds to S26. In S26, the control unit 24 transfers the INVITE that has been sent from the telephone device 40 to the telephone device 60. When a call between the telephone device 40 and the telephone device 60 is connected, the access point 20 relays the telephone communication that is being performed between the telephone device 40 and the telephone device 60.

In a case of NO in S28, the control unit 24 specifies from the telephone information table 70 the IP address that has been stored in association to the SIP URI of the destination (e.g., the telephone device 60) included in the INVITE that was received in S22 (S30). The control unit 24 specifies a channel, authentication/encryption information and a SSID not included in the usage channel table 80 (i.e., not being used currently) and registers the same in the usage channel table 80 (S32). The control unit 24 sends a redirection request 140 to the source (e.g., the telephone device 40) of the INVITE received in S22 (S34. The configuration of the INVITE packet is described in the upper tier of FIG. 8. A specific example of the packet is shown in the bottom tier of FIG. 8. The redirection request 140 includes a command 142, a connection ID 144, a channel 146, authentication/encryption information 148, SSID 150, and a destination IP 152. The command 142 includes a command indicating the redirection request. The respective information specified in S32 is included in the connection ID 144, the channel 146, the authentication/encryption information 148 and the SSID 150. The destination IP 152 includes the IP address specified in S30.

The control unit 24 sends an ad-hoc shifting request 160 to the destination telephone device (e.g., the telephone device 60) of the INVITE received in S22 (S36). The upper tier of FIG. 9 describes the configuration of the ad-hoc shifting request packet. The lower tier of FIG. 9 shows a specific example of the packet. The ad-hoc shifting request 160 includes a command 162, a connection ID 164, a channel 166, authentication/encryption information 168, and a SSID 169. The command 162 includes a command indicating the ad-hoc shifting request. The connection ID 164, the channel 166, the authentication/encryption information 168, and the SSID 169 are the same contents as the respective information 144, 146, 148 and 150 of the redirection request 140.

The control unit 24 monitors for a reception of a channel release notice 170 that has been sent from a telephone device (S38). The channel release notice 170 is sent from the respective telephone devices in a case where the ad-hoc communication of the pair of telephone devices has ended. The upper tier of FIG. 10 describes the configuration of the channel release notice 170 packet. The lower tier of FIG. 10 shows a specific example of the packet. The channel release notice 170 includes a command 172, a connection ID 174, an ad-hoc communication result 176, a first IP 178, a first SIP URI 180, a second IP 182 and a second SIP URI 184. The command 172 includes a command indicating the channel release. The connection ID 174 includes the connection ID that the telephone device, which sent the channel release notice 170, used in the ad-hoc communication. The ad-hoc communication result 176 comprises information denoting whether or not the ad-hoc communication was performed successfully. In a case where the ad-hoc communication was performed successfully, the ad-hoc communication result 176 includes information denoting "success". On the other hand, in a case where the ad-hoc communication became impossible, the ad-hoc communication result 176 includes information denoting a "KEEP ALIVE error". The first IP 178 and the first SIP URI 180 respectively include the IP address and the SIP URI of the source telephone device of the channel release notice 170. The second IP 182 and the second SIP URI 184 respectively include the IP address and the SIP URI of the telephone device that performed the ad-hoc communication with the source telephone device of the channel release notice 170.

In a case of NO in S38, the control unit 24 proceeds to S14. On the other hand, in a case of YES in S38, the control unit 24 checks whether or not information denoting a "KEEP ALIVE error" is recorded as the ad-hoc communication result 176 of the channel release notice 170 received in S38 (S40). In a case of NO in S40, the control unit 24 proceeds to S46. On the other hand, in a case of YES in S40, the control unit 24 registers pertinent information in the poor connection table 90 based on the information included in the channel release notice 170 received in S38 (S42), and proceeds to S46. That is, the control unit 24 respectively registers the information of the first IP 178, the first SIP URI 180, the second IP 182 and the second SIP URI 184 in the first IP 92, the first SIP URI 94, the second IP 96 and the second SIP URI 98 (refer to FIG. 5). Further, the control unit 24 records current time in the occurrence time 99 of the poor connection table 90. In S46, the control unit 24 deletes from the usage channel table 80 the connection ID 82 that matches the connection ID 174 included in the channel release notice 170 received in S38, and the usage channel 84, authentication/encryption information 86, SSID 88, and sending time 89 (Refer to FIG. 4) registered in association to this connection ID 82, and proceeds to S14. The access point 20 repeatedly executes the processing from S14 through S46.

(Timer Process of the Access Point)

Figure 11:
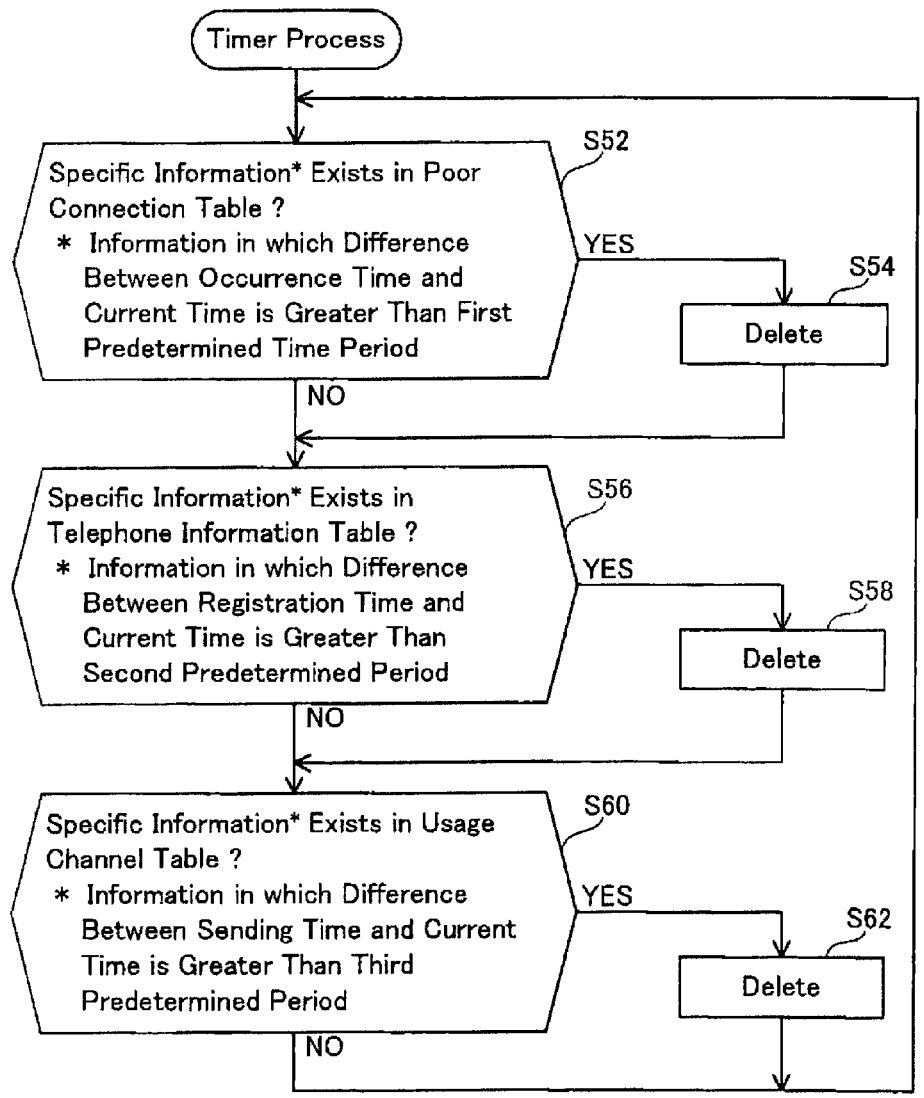
FIG. 11 shows a flowchart of a timer process.

The control unit 24 executes a timer process as shown in FIG. 11 in parallel with the above-mentioned main process. The control unit 24 monitors whether or not there is an occurrence time 99, from among the respective occurrence times 99 (refer to FIG. 5) in the poor connection table 90, for which a difference with the current time is greater than a first predetermined time period (S52). In a case of NO in S52, the control unit 24 proceeds to S56. On the other hand, in a case of YES in S52, the control unit 24 deletes the combination of 92-99 for which the determination in S52 was YES (S54), and proceeds to S56. In S56, the control unit 24 monitors whether or not there is a registration time 76, from among the respective registration times 76 (Refer to FIG. 3) in the telephone information table 70, for which the difference with the current time is greater than a second predetermined time period. In a case of NO in S56, the control unit 24 proceeds to S60. On the other hand, in a case of YES in S56, the control unit 24 deletes the combination of 72-76 for which the determination in S56 was YES (S58), and proceeds to S60.

In S60, the control unit 24 monitors whether or not there is a sending time 89, from among the respective sending times 89 (Refer to FIG. 4) in the usage channel table 80, for which the difference with the current time is greater than a third predetermined time period. In a case of NO in S60, the control unit 24 proceeds to S52. On the other hand, in a case of YES in S60, the control unit 24 deletes the combination 82-89 for which the determination in S60 was YES (S62), and proceeds to S52. The control unit 24 repeatedly executes the processing from S52 through S62. Furthermore, the first, second and third predetermined time periods are set beforehand by the designer or user of the access point 20. The first, second and third predetermined time periods may differ from one another, or may be the same.

(Telephone Information Sending Process of the Telephone Device)

Figure 12:
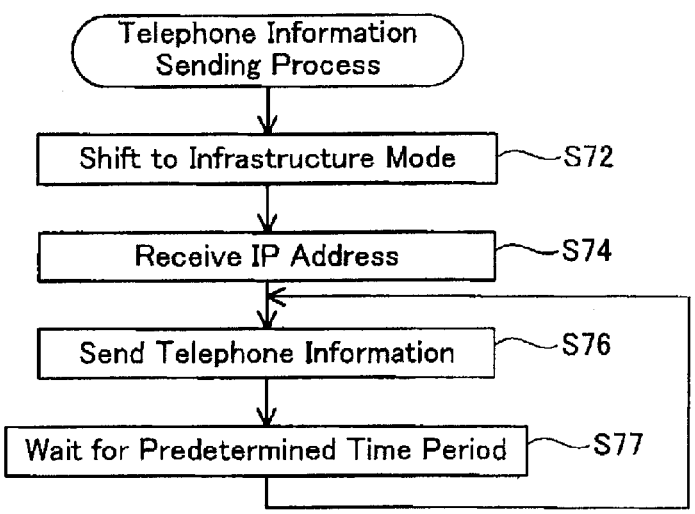
FIG. 12 shows a flowchart of a telephone information sending process for a telephone device.

Next, the processes executed by the control unit 42 of the telephone device 40 will be explained. Furthermore, the telephone devices 60 and 130 also execute the same processes as the telephone device 40. First, the content of a telephone information sending process of the telephone device 40 will be explained with reference to FIG. 12. When the power is turned ON, the control unit 42 shifts to the infrastructure mode (S72). The control unit 42 receives IP address(es) by way of the wireless communication I/F 44 (S74). Specifically, the control unit 42 queries the IP address(es) in a broadcast via the wireless communication I/F 44. For example, in a case where the access point 20 is connected to a DHCP server (not shown in the drawing), the DHCP server receives the IP address query from the telephone device 40 via the access point 20. The DHCP server specifies the IP address of the telephone device 40, and sends the specified IP address to the telephone device 40. The control unit 42 then sends telephone information to the access point 20 (S76). The telephone information includes the SIP URI and IP address of the telephone device 40. The telephone information that has been sent in this step is received by the access point 20 in S14 of FIG. 7. The control unit 42 waits for over a predetermined time period (S77) and repeats S76.

(Main Process of the Telephone Device)

Figure 13:
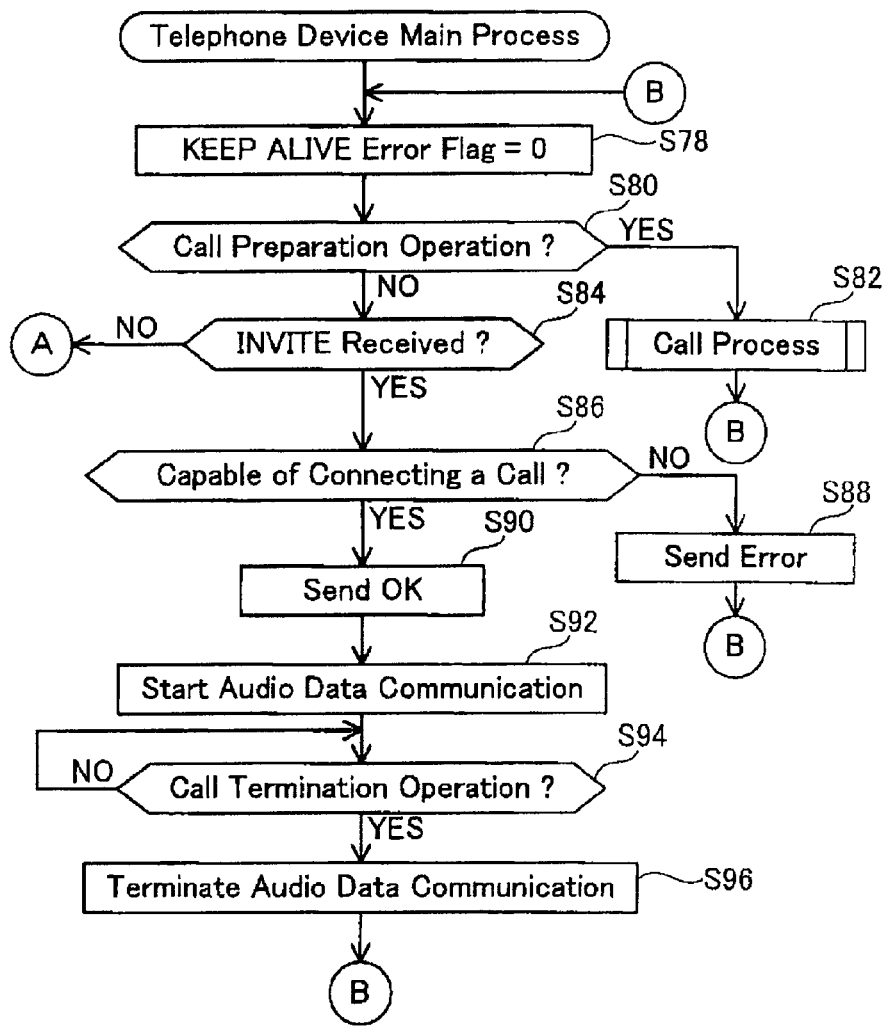
FIG. 13 shows a flowchart of a telephone device main process.

Next, the contents of a main process of the telephone device 40 will be explained with reference to FIGS. 13 and 14. The execution of this main process is triggered by the power of the telephone device 40 being turned ON. The control unit 42 sets the KEEP ALIVE error flag stored in the storage unit 54 to "0" (S78). In a case of the KEEP ALIVE error flag being "0", the control unit 42 skips S78. The control unit 42 monitors for an execution of a call preparation operation at the operation unit 46 (S80). The call preparation operation includes inputting the SIP URI of the phone that the user wishes to make a call to (e.g., selecting the SIP URI from the telephone directory stored in the storage unit 54, or inputting the SIP URI directly), and thereafter operating the starting key (CALL/TALK key).

In a case of YES in S80, the control unit 42 executes the call process (S82) and proceeds to S78. The content of the call process will be explained in detail below. On the other hand, in a case of NO in S80, the control unit 42 proceeds to S84. In S84, the control unit 42 determines whether or not INVITE sent from the access point 20 (refer to S26 of FIG. 7) has been received. In a case of YES in S84, the control unit 42 determines whether or not the telephone device 40 is capable of connecting a call (S86). An example of a case in which the INVITE sent from the telephone device 60 was received will be explained hereinbelow. For example, in a case where the telephone device 40 is performing a telephone communication with the telephone device 130 when the INVITE from the telephone device 60 has been sent, the control unit 42 determines that connecting the call is not possible. In a case of NO in S86, the control unit 42 sends a response showing an error with respect to the INVITE (S88), and proceeds to S78. For example, the control unit 42 sends "486 Busy Here" as the response to the INVITE in a case where the telephone device 40 is performing a telephone communication with the telephone device 130.

In a case where the telephone device 40 is not performing a telephone communication with another telephone device when the INVITE from the telephone device 60 has been sent, the control unit 42 executes a predetermined notice (outputs a ringtone, vibrates the body of the telephone device, and so forth) upon receiving the INVITE in S84. The user is able to perform a call start operation (e.g., a CALL/TALK key operation) while the above-mentioned predetermined notice is being executed. In accordance with this, the control unit 42 makes a determination of YES in S86. The control unit 42 sends "200 OK" as the response to the INVITE received in S84 (S90). The control unit 42 then executes an audio data communication with the telephone device 60 via the access point 20 (S92). The user is hereby able to use the telephone device 40 to communicate telephonically with the user of the telephone device 60 in the infrastructure mode. The control unit 42 monitors for a call termination operation in the operation unit 46 (S94). The call termination operation is, for example, an END key operation performed in the operation unit 46 by the user. In a case of YES in S94, the control unit 42 terminates the audio data communication with the telephone device 60 (S96) and proceeds to S78. Furthermore, in a case where the call termination operation is executed in the telephone device 60 of the calling party, the telephone device 40 receives "BYE". In this case as well, the control unit 42 makes the determination of YES in S94.

Figure 14:
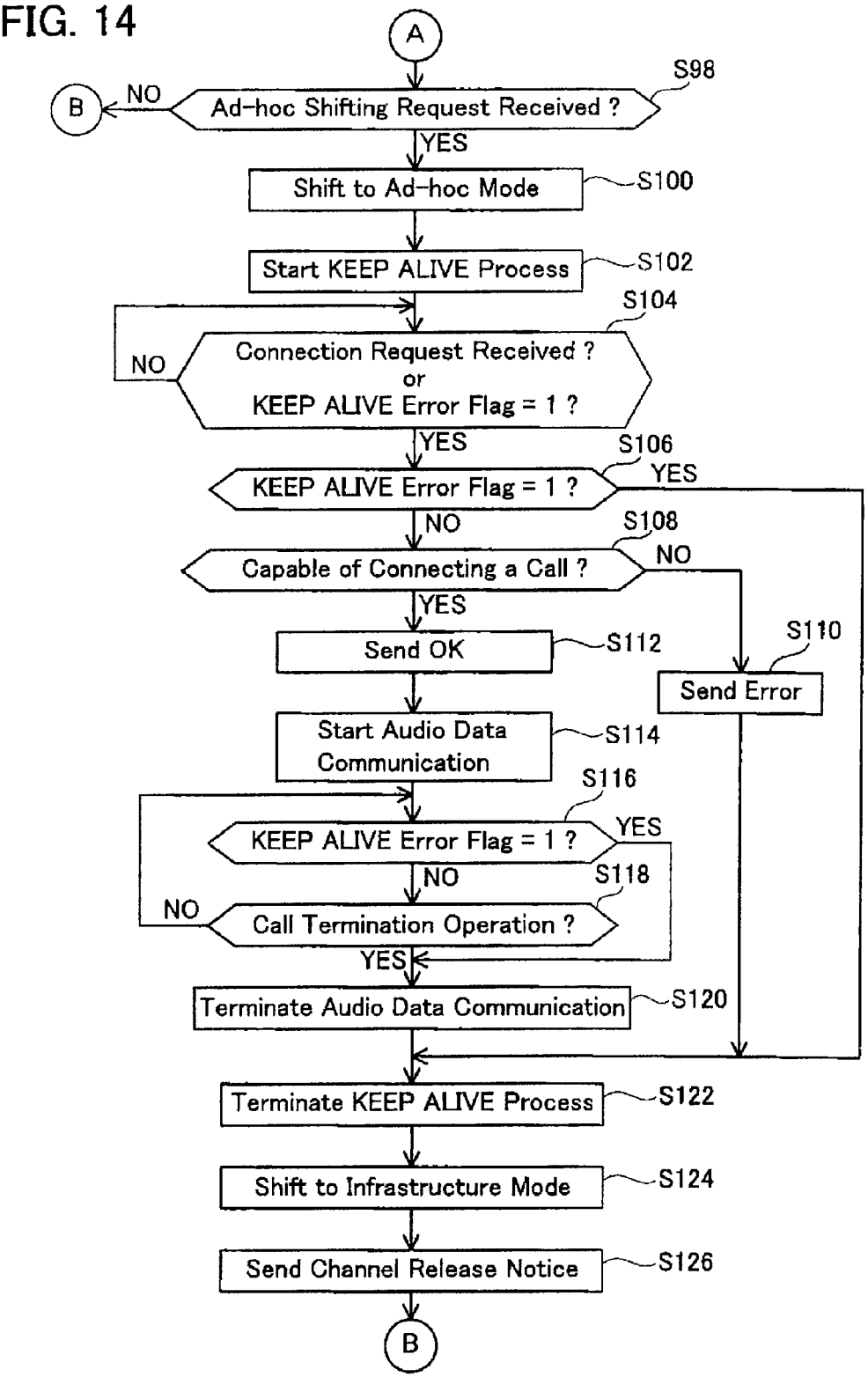
FIG. 14 shows a continuation of the flowchart of FIG. 13.

On the other hand, in a case of NO in S84, the control unit 42 determines whether or not the ad-hoc shifting request 160 sent from the access point 20 (Refer to S36 of FIG. 7) has been received (S98 of FIG. 14). In a case of NO in S98, the control unit 42 proceeds to S80. On the other hand, in a case of YES in S98, the control unit 42 shifts to the ad-hoc mode (S100). The ad-hoc communication is performed in the communication of S100 and beyond (e.g., S110 through S114). The control unit 42 then starts a KEEP ALIVE process (S102). The KEEP ALIVE process will be explained in detail below. The control unit 42 waits until it either receives a connection request, which will be explained hereinbelow, or until the KEEP ALIVE error flag is changed to "1" (S104). In a case of YES in S104, the control unit 42 checks whether or not the KEEP ALIVE error flag is "1" (S106). In a case of YES in S106, the control unit 42 proceeds to S122. On the other hand, in a case of NO in S106, the telephone device 40 has received a connection request sent from another telephone device. An example of a case in which a connection request sent from the telephone device 60 has been received will be explained below.

The control unit 42 determines whether or not the telephone device 40 is capable of connecting a call (S108). The determination here is the same as that of S86 of FIG. 13. In a case of NO in S108, the control unit 42 sends a response indicating an error to the telephone device 60 (S110), and proceeds to S122. In a case where the telephone device 40 is not performing telephone communications with another telephone device, the control unit 42 executes a predetermined notice (outputs a ringtone, vibrates the body of the telephone device, or the like) upon making a determination of NO in S106. The user is able to execute a call start operation (for example, a CALL/TALK key operation) while the above-mentioned predetermined notice is being executed. In accordance with this, the control unit 42 makes a determination of YES in S108. The control unit 42 sends a response indicating OK to the telephone device 60 (S112). The control unit 42 then executes the audio data ad-hoc communication with the telephone device 60 (S114). The user is hereby able to use the telephone device 40 to communicate telephonically with the user of the telephone device 60 in the ad-hoc mode. The control unit 42 monitors for the transition of the KEEP ALIVE error flag to "1" (S116). In a case of YES in S116, the control unit 42 terminates the audio data communication with the telephone device 60 (S120), and proceeds to S122. On the other hand, in a case of NO in S116, the control unit 42 monitors for a call termination operation to be performed in the operation unit 46 (S118). In a case of NO in S118, the control unit 42 proceeds to S116. On the other hand, in a case of YES in S118, the control unit 42 terminates the audio data communication with the telephone device 60 (S120), and proceeds to S122.

In S122, the control unit 42 terminates the KEEP ALIVE process, which will be described below. Next, the control unit 42 shifts to the infrastructure mode (S124). In accordance with this, the infrastructure communication is performed in the subsequent communication (e.g., S126). The control unit 42 sends the channel release notice 170 to the access point 20 (S126), and proceeds to S80. The telephone device 40 repeatedly executes the processing from S80 through S126.

(Keep Alive Process of the Telephone Device)

Figure 15:
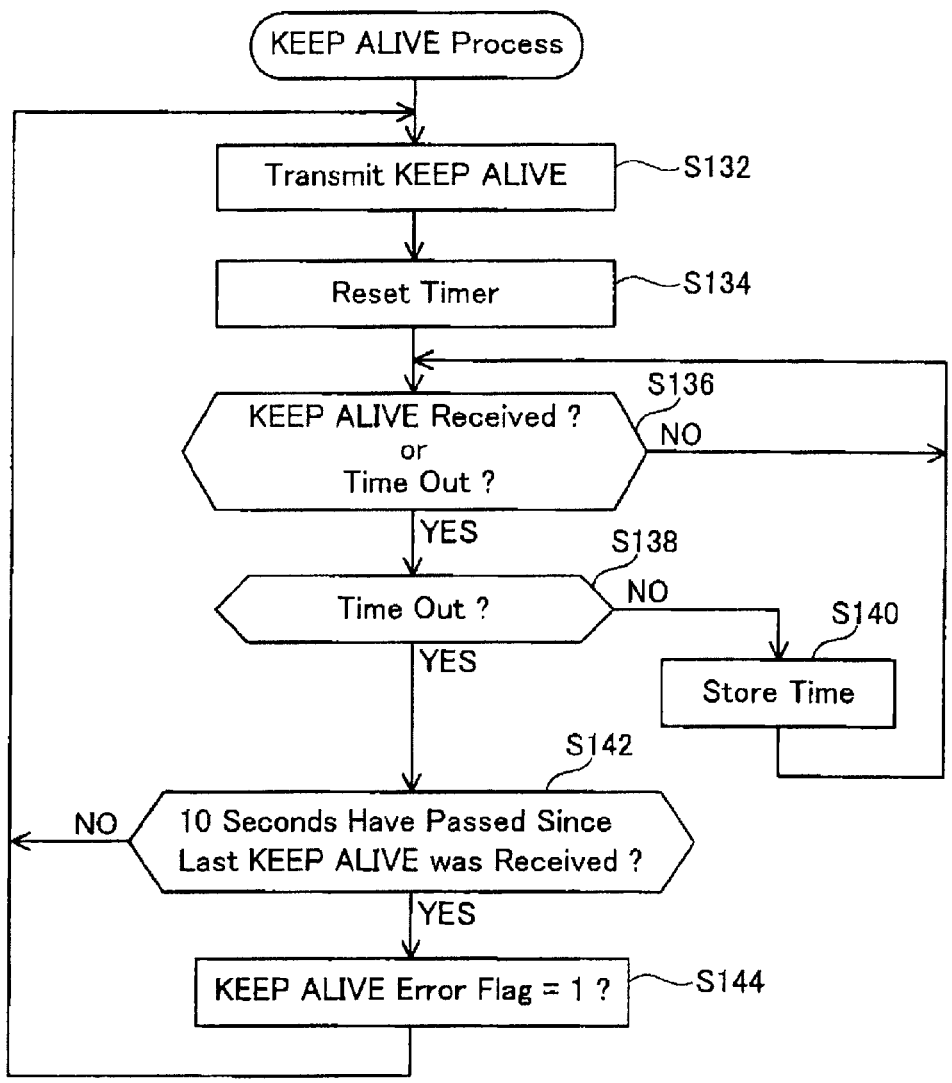
FIG. 15 shows a flowchart of a KEEP ALIVE process.

An example of a case in which the telephone device 40 performs the ad-hoc communication with the telephone device 60 will be explained with reference to FIG. 15. The control unit 42 transmits a KEEP ALIVE packet (S132). The KEEP ALIVE packet includes the identification information of the telephone device 40 (for example, the telephone device 40 IP address and so forth). The telephone device 60, which receives the KEEP ALIVE packet transmitted from the telephone device 40, is able to identify that the telephone device 40 is capable of ad-hoc communication. In S134, the control unit 42 resets the timer (not shown in the drawing). Furthermore, the telephone device 60, which is performing the ad-hoc communication with the telephone device 40, also regularly transmits the KEEP ALIVE packet. The control unit 42 waits to either receive the KEEP ALIVE packet transmitted from the telephone device 60, or until a predetermined time period (e.g., 5 seconds) has elapsed on the timer (i.e., until a time out; S136). In a case of YES in S136, the control unit 42 checks whether or not the time out has occurred (S138). In a case of NO in S138, this means that the KEEP ALIVE packet transmitted from the telephone device 60 has been received. In this case, the control unit 42 stores the current time in the storage unit 54 (S140), and proceeds to S136.

In the other hand, in a case of YES in S138, the control unit 42 determines whether or not a difference between a time stored in S140 and the current time is 10 seconds or more (S142). That is, the control unit 42 monitors for receptions at intervals of less than 10 seconds of the KEEP ALIVE packets from the telephone device 60 that is performing the ad-hoc communication. It should be noted that the interval for receiving the KEEP ALIVE packet is not limited to 10 seconds. In a case of NO in S142, the control unit 42 proceeds to S132. As a result of this, the control unit 42 regularly transmits the KEEP ALIVE packet at the above-mentioned predetermined time period interval. Meanwhile, in a case of YES in S142, the control unit 42 sets the KEEP ALIVE error flag stored in the storage unit 54 to "1" (S144), and proceeds to S132. The control unit 42 repeats the processing from S132 through S144 from when the KEEP ALIVE process is started until it is cancelled (from S102 until S116 of FIG. 13).

(Call Process of the Telephone Device)

Figure 16:
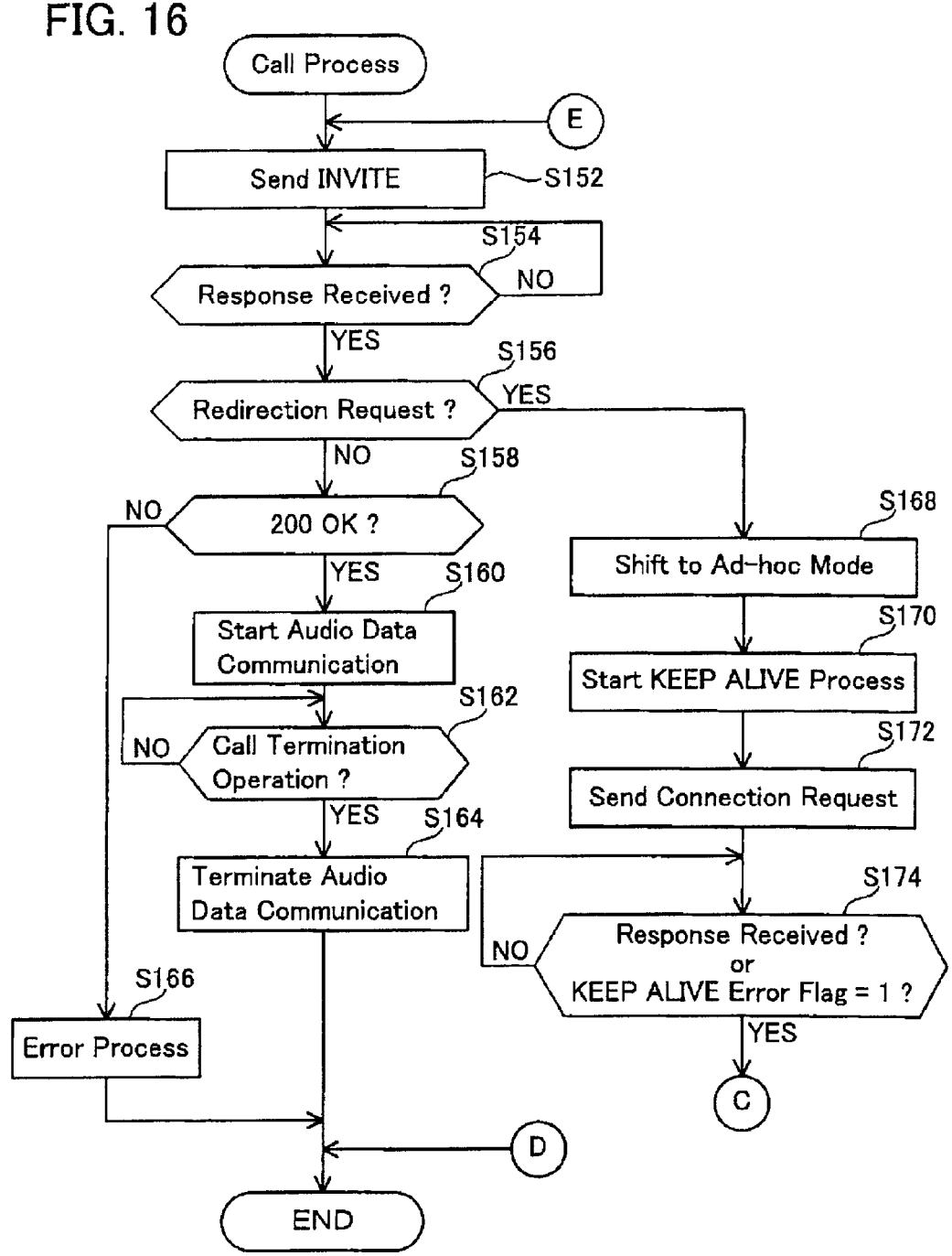
FIG. 16 shows a flowchart of a call process.
Figure 17:
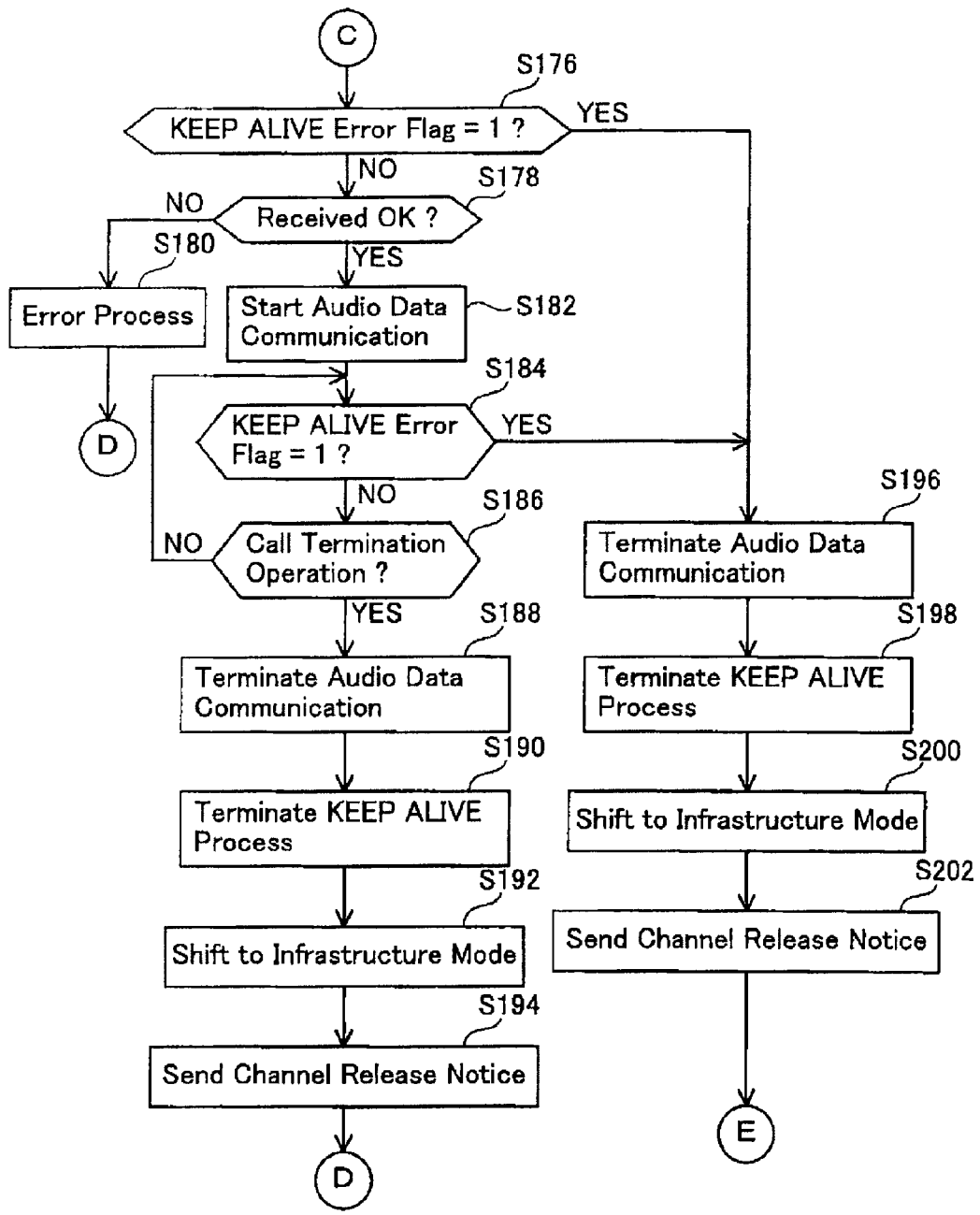
FIG. 17 shows a continuation of the flowchart of FIG. 16.

Next, the contents of the control unit 42 call process (the processing of S82 of FIG. 13) will be explained. FIGS. 16 and 17 show a flowchart of the call process. An example of a case in which the telephone device 40 sends INVITE with the telephone device 60 as the destination will be explained. The control unit 42 sends the INVITE to the access point 20 upon the call preparation operation being performed by the user (S152). The control unit 42 waits until a response is received with respect to the INVITE (S154). In a case of YES in S154, the control unit 42 checks whether or not the received response is a redirection request 140 (S156). In a case of NO in S156, the control unit 42 checks whether or not the response is "200 OK" (S158). In a case of YES in S158, the control unit 42 executes the audio data communication with the telephone device 60 via the access point 20 (S160). That is, the control unit 42 performs the infrastructure communication. The control unit 42 monitors for a call termination operation to be performed at the operation unit 46 (S162). In a case of YES in S162, the control unit 42 terminates the audio data communication with the telephone device 60 (S164), and ends the processing. On the other hand, in a case of NO in S158, the control unit 42 executes an error process (S166), and ends the processing. For example, the control unit 42 may display on the display unit 48 information indicating that the telephone device 60 is incapable of taking the call. Or alternately, the control unit 42 may output from the speaker 50 a sound (for example, a busy sound) indicating that the telephone device 60 is incapable of taking the call. The user is able to learn that the call cannot be connected to the telephone device 60 by checking the display on the display unit 48 or the sound from the speaker 50.

In a case of YES in S156, the control unit 42 shifts to the ad-hoc mode (S168). The control unit 42 starts the KEEP ALIVE process (S170; refer also to FIG. 15). The control unit 42 uses the respective information included in the redirection request 140 received in S156 to send a connection request to the telephone device 60 (S172). The control unit 42 then waits to either receive the response with respect to the connection request, or until the KEEP ALIVE error flag transitions to "1" (S174). In a case of YES in S174, the control unit 42 checks whether or not the KEEP ALIVE error flag is "1" (S176 of FIG. 17). In a case of YES in S176, the control unit 42 proceeds to S196. On the other hand, in a case of NO in S176, the control unit 42 checks whether or not the response to the connection request is a response indicating connection OK (S178). In a case of NO in S178, the control unit 42 executes the error process (S180), and ends the processing. For example, the control unit 42 may display on the display unit 48 information indicating that the telephone device 60 is incapable of taking the call. Or, for example, the control unit 42 may output from the speaker 50 a sound (e.g., a busy sound) indicating that the telephone device 60 is incapable of taking the call. The user is able to learn that the call cannot be connected to the telephone device 60 by checking the display on the display unit 48 or the sound from the speaker 50. On the other hand, in a case of YES in S178, the control unit 42 performs the audio data ad-hoc communication with the telephone device 60 without going through the access point 20 (S182). In accordance with this, the user is able to use the telephone device 40 to communicate telephonically with the user of the telephone device 60 in the ad-hoc mode.

The control unit 42 monitors for the KEEP ALIVE error flag to be changed to "1" (S184). In a case of YES in S184, the control unit 42 proceeds to S196. Whereas, in a case of NO in S184, the control unit 42 monitors for the call termination operation to be performed in the operation unit 46 (S186). In a case of NO in S186, the control unit proceeds to S184. In a case of YES in S186, the control unit 42 terminates the audio data communication with the telephone device 60 (S188). The control unit 42 terminates the KEEP ALIVE process (S190), and then shifts to the infrastructure mode (S192). The control unit 42 sends the channel release notice 170 to the access point 20 (S194), and ends the processing. The ad-hoc communication result 176 of the channel release notice 170 sent in S194 includes information indicating "success".

In S196, the control unit 42 terminates the ad-hoc communication with the telephone device 60. The control unit 42 terminates the KEEP ALIVE process (S198), then shifts to the infrastructure mode (S200). In accordance with this, the infrastructure communication is performed in the subsequent communication (e.g., S202). The control unit 42 sends the channel release notice 170 to the access point 20 (S202), and proceeds to S152. The ad-hoc communication result 176 of the channel release notice 170 sent in S202 includes information indicating "KEEP ALIVE error". In a case where it has become impossible to perform the ad-hoc communication with the telephone device 60 without the call termination operation having been performed at the operation unit 46, the control unit 42 shifts to the infrastructure mode and sends INVITE to the telephone device 60 via the access point 20. In accordance with this, it is possible to perform the infrastructure communication with the telephone device 60.

The system 10 of this embodiment will be explained in detail. In a case where the INVITE with the telephone device 60 as the destination has been received from the telephone device 40, the access point 20, on a condition that the telephone device 60 is located in the wireless communication area 22, sends a redirection request 140 and an ad-hoc shifting request 160 so that the ad-hoc communication becomes possible between the telephone device 40 and the telephone device 60 (S34 and S36 of FIG. 7). The telephone device 40 attempts the ad-hoc communication with the telephone device 60 (S172 of FIG. 16). As a result of this, the telephone device 40 is able to perform the ad-hoc communication with the telephone device 60. The access point 20 need not relay the audio data communication between the telephone device 40 and the telephone device 60. This makes it possible to lessen the communication load of the access point 20.

The access point 20 records via the poor connection table 90 a combination of telephone devices that is incapable of performing the ad-hoc communication. In a case where a combination of the telephone device 40 and the telephone device 60 is recorded in the poor connection table 90, the access point 20 sends the INVITE from the telephone device 40 with the telephone device 60 as the destination to the telephone device 60. In accordance with this, it is possible to prevent the telephone device 40 and the telephone device 60 from attempting the ad-hoc communication which cannot be performed between the telephone devices 40 and 60.

The access point 20 manages the channel 84, the authentication/encryption information 86 and the SSID 88, which are utilized in the ad-hoc communication, by utilizing the usage channel table 80. Hence, it is possible to prevent crossed lines of communication resulting from the overlapping of the channels used in the ad-hoc communication. Further, the access point 20 sends the channel 84, the authentication/encryption information 86 and the SSID 88 to the two telephone devices that will perform the ad-hoc communication (S34 and S36 of FIG. 7). Consequently, a channel for a telephone device need not be established beforehand, and the user does not have to establish a channel each time the ad-hoc communication is performed.

The access point 20 executes the timer process. When supposing that the telephone device 40 may move outside the wireless communication area 22 while performing the ad-hoc communication with the telephone device 60, the access point 20 is unable to receive a channel release notice from the telephone device 40. To deal with this, the access point 20 is able to prevent a situation in which it becomes impossible to delete the channel that the telephone device 40 is using from the usage channel table 80.

The telephone device 40 executes the KEEP ALIVE process while performing the ad-hoc communication. The telephone device 60 is able to learn that the telephone device 40 is capable of performing the ad-hoc communication by receiving the KEEP ALIVE from the telephone device 40.

In the case where it becomes impossible for the telephone device 40 to perform the ad-hoc communication (S116: YES) without the call termination operation having been performed (S118: NO), the telephone device 40 sends the INVITE to the access point 20. The access point 20 then transfers the INVITE to the telephone device 60. In accordance with this, the telephone device 40 is able to communicate via the access point 20.

A variation of the above-mentioned embodiment will be described. For example, it is supposed that the access point 20 receives the INVITE from the telephone device 40 with the telephone device 60 as the destination, and, in addition to this, the telephone device 40 and the telephone device 60 are performing the ad-hoc communication. In a case where the channel release notice 170 has been received from either the telephone device 40 or the telephone device 60, the control unit 24 may send to the telephone device 60 the previously received INVITE on the condition that information indicating "KEEP ALIVE error" is included in the ad-hoc communication result 176. In this configuration, the telephone device 40 does not have to send a new INVITE in the case where the ad-hoc communication has become impossible.

For example, a portion of the components of the access point 20 may be configured differently. For example, a first device, which comprises the wireless communication I/F 26, and a second device, which comprises the control unit 24, the network I/F 28 and the storage unit 30, may be separated.

For example, in the above-mentioned embodiment, the access point 20 may determine that the telephone devices 40 and 60 are located inside the wireless communication area 22 by receiving the telephone information from the telephone devices 40 and 60 that are located inside the wireless communication area 22. However, the access point 20 may also transmit a signal for querying the telephone information inside the wireless communication area 22. In a case where there is a response with respect to the signal, including the telephone information of the respondent devices 40, 60, the access point 20 may determine that the telephone devices 40 and 60 are located inside the wireless communication area 22.

A relay device (e.g., the access point 20) described in the above embodiment may send connection information (e.g., IP address) of a second wireless telephone device (e.g., telephone device 40) to a first wireless telephone device (e.g., telephone device 60) on a condition that the second wireless telephone device is located within a wireless communication area of the relay device. In a case where the second wireless telephone device is located within the wireless communication area of the relay device, the first wireless telephone device and the second wireless telephone device are located relatively close to one another. Under such a circumstance, there is a high likelihood that the first wireless telephone device is able to communicate directly with the second wireless telephone device (i.e., using an ad-hoc communication). According to this technology, it is possible to have the first and second wireless telephone devices perform a telephone communication, which uses an ad-hoc communication that does not go through the relay device. Consequently, it is possible to lessen the communication load on the relay device.

For example, in a case where the wireless telephone device may perform a telephone communication using an IP network, the telephone identification information may be SIP URI (Session Initiation Protocol Uniform Resource Identifier). For example, in a case where the determining unit receives a signal transmitted from the second wireless telephone device, a determination may be made that the second wireless telephone device is located within the wireless communication area. Alternatively, a signal may be transmitted to within the wireless communication area, and in a case where a response to this signal is received from the second wireless telephone device, the determining unit may determine that the second wireless telephone device is located within the wireless communication area. In addition to this, the connection information may be an IP address in a case where the wireless telephone device performs the telephone communication using the IP network.

In a case where the second wireless telephone device is not located within the wireless communication area of the relay device (e.g., such as the telephone device 130 relative to the access point 20), there is a high likelihood that the first wireless telephone device and the second wireless telephone device are far apart from one another. Under such a circumstance, the first wireless telephone device and the second wireless telephone device are not able to perform the ad-hoc communication. In the above-mentioned case, the relay device may relay the telephone communication of the first wireless telephone device and the second wireless telephone device. That is, the relay device may further comprise a first transferring unit configured to transfer the call request to the second wireless telephone device on a condition that it is determined that the second wireless telephone device is not being located within the wireless communication area of the relay device.

There are cases where the first wireless telephone device and the second wireless telephone device move further away from one another while the first wireless telephone device is performing an ad-hoc communication with the second wireless telephone device. That is, the distance between the first wireless telephone device and the second wireless telephone device may change over time. With the two wireless telephone devices moving farther away from each other, performing the ad-hoc communication may eventually become impossible. In this circumstance, the first wireless telephone device may send to the relay device the first information indicating that it is not possible to perform the ad-hoc communication with the second wireless telephone device. The relay device, upon receiving the first information, may transfer to the second wireless telephone device a call request so as to make communication between the first wireless telephone device and the second wireless telephone device possible via the relay device. In accordance with this, the first wireless telephone device is able to perform a communication, i.e., a so-called infrastructure communication, with the second wireless telephone device via the relay device in the aforesaid case where it becomes impossible to perform the ad-hoc communication with the second wireless telephone device. Further, the combination information may be deleted in a case where a predetermined time period has been elapsed since the combination information was stored.

In the above embodiment, the wireless telephone device may perform the telephone communication using protocols other than SIP (Session Initiation Protocol). For example, "H.323", "MGCP (Media Gateway Control Protocol)", "H.248/MEGACO (Media Gateway Control)" or other such protocols may be used.

A relay device may be a wireless LAN (Local Area Network) access point.

A call request may be a SIP INVITE command.

A storage unit of the telephone device may store a wireless telephone device information table. Telephone identification information of a wireless telephone device that is located within the wireless communication area may be included in the wireless telephone device information table. In a case where the wireless telephone device performs a telephone communication using an IP network, the wireless telephone device IP address and SIP URI may be recorded in association in the wireless telephone device information table.

The storage unit of the telephone device may store a used channel table. Channel information sent to the wireless telephone device may be recorded in the used channel table.

In the above embodiment, channel information which is not currently used in another ad-hoc communication is identified and used in performing an ad-hoc communication. According to this configuration, it is possible to prevent the same channel information from being used redundantly.

What is claimed is:

1. A wireless telephone system comprising:
   a relay device;
   a first wireless telephone device configured to communicate with another device in a wireless communication area of the relay device; and
   a second wireless telephone device configured to communicate with another device in the wireless communication area of the relay device,
   wherein the relay device comprises:
      a processor; and
      non-transitory memory storing instructions that, when executed, cause the relay device to function as:
         a call request receiving unit configured to receive a call request from the first wireless telephone device, the call request including telephone identification information of the second wireless telephone device;
         a determining unit configured to determine whether or not the second wireless telephone device is located within the wireless communication area of the relay device on a condition that the call request is received; and
         a connection information sending unit configured to send connection information of the second wireless telephone device to the first wireless telephone device on a condition that it is determined that the second wireless telephone device is located within the wireless communication area of the relay device,
   wherein the first wireless telephone device comprises:
      a processor; and
      non-transitory memory storing instructions that, when executed, cause the first wireless telephone device to function as:
         a call request sending unit configured to send the call request to the relay device; and
         a connection request sending unit configured to send a connection request for direct communication with the second wireless telephone device, with the connection information of the second wireless telephone device as a destination of the connection request, and
   wherein the second wireless telephone device comprises:
      a connection request receiving unit configured to receive the connection request.

2. A relay device comprising:
   a processor; and non-transitory memory storing instructions that, when executed, cause the relay device to function as: a call request receiving unit configured to receive a call request from a first wireless telephone device, the call request including telephone identification information of a second wireless telephone device;
   a determining unit configured to determine whether or not the second wireless telephone device is located within a wireless communication area of the relay device on a condition that the call request is received; and
   a connection information sending unit configured to send connection information of the second wireless telephone device to the first wireless telephone device on a condition that it is determined that the second wireless telephone device is located within the wireless communication area of the relay device, wherein the connection information is configured to cause the first wireless telephone device to attempt to establish direct communication with the second wireless telephone device.

3. The relay device as in claim 2, wherein the instructions, when executed, further cause the relay device to function as:
   a first transferring unit configured to transfer the call request to the second wireless telephone device on a condition that it is determined that the second wireless telephone device is not located within the wireless communication area of the relay device.

4. The relay device as in claim 2, wherein the instructions, when executed, further cause the relay device to function as:
   a channel information sending unit configured to send channel information for direct communication between the first and the second wireless telephone devices to both of the first and second wireless telephone devices on the condition that it is determined that the second wireless telephone device is located within the wireless communication area of the relay device.

5. The relay device as in claim 4, wherein,
   the channel information sending unit is configured to send channel information which is not currently being used in another direct communication.

6. The relay device as in claim 2, wherein the instructions, when executed, further cause the relay device to function as:
   an information receiving unit configured to receive first information indicating that it is not possible to perform direct communication between the first and the second wireless telephone devices; and
   a second transferring unit configured to transfer the call request to the second wireless telephone device on a condition that the first information is received.

7. The relay device as in claim 6, wherein the instructions, when executed, further cause the relay device to function as:
   a combination storing unit configured to store combination information indicating a combination of the first and second wireless telephone devices on the condition that the first information is received,
   wherein the second transferring unit is configured to transfer the call request to the second wireless telephone device on a condition that the call request is received while the combination information is being stored in the combination storing unit.

8. The relay device as in claim 7, wherein
   the combination storing unit is configured to delete the combination information in a case where a predetermined time period has elapsed since the combination information has been stored.

9. A wireless telephone device configured to communicate with another device in a wireless communication area of a relay device, the wireless telephone device comprising:
   a processor; and
   non-transitory memory storing instructions that, when executed, cause the wireless telephone device to function as:
      a call request sending unit configured to send a call request to the relay device, the call request including telephone identification information of another wireless telephone device;
      a connection request sending unit configured to send, in a case where connection information of the other wireless telephone device is received from the relay device after sending the call request, a connection request for direct communication with the other wireless telephone device with the connection information of the other wireless telephone device as a destination of the connection request; and
      an information sending unit configured to send first information to the relay device when it becomes impossible to perform the direct communication between the wireless telephone device and the other wireless telephone device during the direct communication, and without a call termination operation for terminating the direct communication having been performed by the wireless telephone device, wherein the first information is configured to cause the relay device to transfer the call request to the other wireless telephone device.

10. The wireless telephone device as in claim 9, wherein the instructions, when executed, further cause the wireless telephone device to function as:
    an information transmitting unit configured to transmit second information at a predetermined interval during the direct communication; and
    an information receiving unit configured to receive the second information transmitted from the other wireless telephone device during the direct communication, wherein the information sending unit is configured to send, in a case where it is not possible to receive the second information transmitted from the other wireless telephone device during the direct communication over a predetermined time period, the first information to the relay device.

* * * * *